(12) United States Patent
Stiesdal

(10) Patent No.: US 9,030,036 B2
(45) Date of Patent: *May 12, 2015

(54) ARRANGEMENT FOR A DIRECT DRIVE GENERATOR FOR A WIND TURBINE AND METHOD FOR THE ASSEMBLY OF THE GENERATOR

(75) Inventor: Henrik Stiesdal, Odense C (DK)

(73) Assignee: Siemens Aktiengesellschaft, München (DE)

( * ) Notice: Subject to any disclaimer, the term of this patent is extended or adjusted under 35 U.S.C. 154(b) by 1405 days.

This patent is subject to a terminal disclaimer.

(21) Appl. No.: 12/313,602

(22) Filed: Nov. 21, 2008

(65) Prior Publication Data

US 2009/0134627 A1    May 28, 2009

(30) Foreign Application Priority Data

Nov. 26, 2007 (EP) ..................... 07022883

(51) Int. Cl.
| | |
|---|---|
| F03D 9/00 | (2006.01) |
| F03D 1/00 | (2006.01) |
| H02K 1/12 | (2006.01) |
| H02K 15/16 | (2006.01) |
| F03D 9/02 | (2006.01) |
| H02K 1/18 | (2006.01) |
| H02K 1/27 | (2006.01) |
| H02K 1/28 | (2006.01) |
| H02K 21/14 | (2006.01) |
| H02K 7/18 | (2006.01) |

(52) U.S. Cl.
CPC ............... *F03D 9/021* (2013.01); *F03D 9/002* (2013.01); *F05B 2220/7066* (2013.01); *H02K 1/185* (2013.01); *H02K 1/278* (2013.01); *H02K 1/28* (2013.01); *H02K 21/14* (2013.01); *H02K 2213/09* (2013.01); *Y02E 10/725* (2013.01); *H02K 7/1838* (2013.01); *H02K 2213/12* (2013.01)

(58) Field of Classification Search
USPC ........ 310/400, 401, 410, 428–429, 431, 418, 310/216.113, 254.1; 290/55
See application file for complete search history.

(56) References Cited

U.S. PATENT DOCUMENTS

| | | | |
|---|---|---|---|
| 4,080,724 A * | 3/1978 | Gillette | ............................ 29/598 |
| 4,291,235 A | 9/1981 | Bergey, Jr. et al. | |

(Continued)

FOREIGN PATENT DOCUMENTS

| | | | | |
|---|---|---|---|---|
| DE | 103 07 813 | * | 9/2004 | ............... H02K 9/10 |
| WO | WO 98/20595 A1 | | 5/1998 | |

(Continued)

*Primary Examiner* — Burton Mullins

(57) ABSTRACT

The invention concerns an arrangement for a direct drive generator for a wind turbine, which generator comprises a stator with several stator segments each stator segment having at least one stator element for the power generation and which generator comprises a rotor pivotable around a center axis of the generator and relatively to the stator with several rotor segments each rotor segment having at least one rotor element for the power generation, wherein said arrangement comprises at least one stator segment and at least one rotor segment, and wherein the at least one stator segment and the at least one rotor segment are able to be at least temporarily supported against each other. The invention concerns further a direct drive generator comprising such an arrangement, a wind turbine comprising such a direct drive generator as well as a method for the assembly of the direct drive generator.

13 Claims, 3 Drawing Sheets

(56) References Cited

U.S. PATENT DOCUMENTS

| | | | |
|---|---|---|---|
| 4,594,552 A | | 6/1986 | Grimaldi et al. |
| 5,177,388 A | | 1/1993 | Hotta et al. |
| 5,844,341 A | * | 12/1998 | Spooner et al. ............... 310/112 |
| 5,952,746 A | * | 9/1999 | Mittmann et al. .......... 310/12.31 |
| 6,781,276 B1 | * | 8/2004 | Stiesdal et al. ............. 310/254.1 |
| 6,798,082 B1 | * | 9/2004 | Chen ............................... 290/55 |
| 7,205,678 B2 | * | 4/2007 | Casazza et al. ................. 290/55 |
| 7,394,177 B2 | * | 7/2008 | Vogt et al. ....................... 310/91 |
| 7,671,496 B2 | * | 3/2010 | Groening .................. 310/75 R |
| 7,772,738 B2 | * | 8/2010 | Huppunen et al. ..... 310/216.001 |
| 7,808,149 B2 | * | 10/2010 | Pabst et al. ............. 310/216.086 |
| 2007/0075548 A1 | * | 4/2007 | Bagepalli et al. ................ 290/55 |
| 2009/0134628 A1 | * | 5/2009 | Stiesdal .......................... 290/55 |
| 2009/0134629 A1 | * | 5/2009 | Stiesdal .......................... 290/55 |
| 2010/0194226 A1 | * | 8/2010 | Metzner et al. .......... 310/156.21 |

FOREIGN PATENT DOCUMENTS

| | | |
|---|---|---|
| WO | 03003541 A1 | 1/2003 |
| WO | 2006008331 A1 | 1/2006 |

* cited by examiner

ARRANGEMENT FOR A DIRECT DRIVE GENERATOR FOR A WIND TURBINE AND METHOD FOR THE ASSEMBLY OF THE GENERATOR

CROSS REFERENCE TO RELATED APPLICATIONS

This application claims priority of European application No. 07022883.8 filed Nov. 26, 2007, which is incorporated by reference herein in its entirety.

FIELD OF THE INVENTION

The invention relates to an arrangement for a direct drive generator, a direct drive or directly driven generator comprising the arrangement, a wind turbine comprising a direct drive generator as well as to a method for the assembly of a direct drive generator.

BACKGROUND OF THE INVENTION

In principle there are two main types of wind turbines in view of the drive configuration of a wind turbine. The first type of a wind turbine is the more classical type of a wind turbine comprising a gearbox arranged between a main shaft and a generator of the wind turbine. The second type of a wind turbine is a gearless type, whereat the gearbox and the conventional generator are substituted by a multipolar generator, a so called direct drive or directly driven generator. Such a direct drive generator can be made as a synchronous generator with winded rotor or with permanent magnets attached to the rotor, or it can be designed as an alternative type of a generator.

Common to direct driven generators is that their physical dimensions are relatively large. At a typical air gap diameter of approximately 5 m for a multi-megawatt direct drive generator the outer diameter is on the order of approximately 6 m or even more. The large outer diameter makes the transport of the direct drive generator difficultly and the heavy dead load of the direct drive generator involves further difficulties e.g. concerning the replacement for repair by occurred breakdowns.

A further difficulty arises in the normal configuration of a wind turbine with a direct drive generator, where the direct drive generator is arranged between the wind turbine rotor and the tower in order to yield a compact machine construction. In this case it will be necessary to dismantle the whole wind turbine rotor by a required dismantling of the direct drive generator.

To overcome these problems at least partially there were some suggestions to divide parts of the generator.

In WO 98/20595 A1 a stator for a rotating electric machine is disclosed comprising a stator core and a winding. The stator core is provided with stator teeth extending radially inwards towards a rotor. Each stator tooth is configured as a number of tooth sections joined axially into a stator tooth plank. That stator tooth planks are fitted together side by side thus forming a section of the stator core. This construction makes the transport of parts of the rotating electric machine to the site of erection partially easier, because the stator can be assembled on site. However, this construction requires a stator housing as such having relatively large outer dimensions.

From U.S. Pat. No. 4,594,552 an armature winding of a split stator is known. The split stator has a slotted core divided by at least two circumferentially-spaced split lines to facilitate the assembly and the disassembly of the split stator. The armature winding comprises armature coils in the slots of the stator core connected to provide poles and arranged to provide a plurality of armature coils divided at the split lines. Connecting and disconnecting means are provided to connect and disconnect the armature coils when the split stator is assembled and disassembled, respectively. This construction, however, also requires a stator housing as such having relatively large outer dimensions.

U.S. Pat. No. 5,844,341 describes an electric generator to be driven by a low speed device such as wind turbine. The generator consists of one or more rotor rings of many permanent magnets of alternating polarity and coaxial stator rings of many laminated yokes, each yoke defining slots to locate coils. The yokes and coils form modules which are supported by beams relatively to the rotor rings. The drawback of this configuration is that the electromechanical properties in this form of modular construction with single polar pairs separated by air gaps may be disadvantageous, and that a possible dismantling of a single stator module can involve that the whole generator has to be opened in situ implying risk of humidity, dirt etc., and that it may be cumbersome if the stator module has to be taken out in a disadvantageous direction.

U.S. Pat. No. 6,781,276 B1 describes a generator for a wind turbine comprising a stator and a rotor. The stator has a number of stator modules that are individual and which may be installed, repaired and dismantled individually and independently of each other. This generator has no part larger than the air gap diameter. But even if no part is larger than the air gap diameter, the largest element to be transported still has a substantial size, given that the rotor is a single piece. In its completed form this rotor is fitted with strong permanent magnets and needs to be covered by a nonmagnetic layer, e.g. wood or polystyrene of a certain thickness during transportation, and while the dimensions of the rotor are smaller than the dimensions of the finished generator, it is still at maybe 5 m diameter and 1.5 m length a very substantial piece of equipment to transport.

SUMMARY OF THE INVENTION

It is therefore an object of the present invention to provide an arrangement for a direct drive generator and a generator as initially mentioned in such a way, that in particular the transport of the generator to the site of erection is simplified. It is a further object of the invention to indicate a wind turbine comprising a respective generator as well as a method for the assembly of the generator of the wind turbine.

This object is inventively achieved by an arrangement for a direct drive or directly driven generator for a wind turbine, which generator comprises a stator with several stator segments each stator segment having at least one stator element operative for the electrical power generation and which generator comprises a rotor rotatable around a center axis of the generator and relatively to the stator with several rotor segments each rotor segment having at least one rotor element operative for the electrical power generation, wherein said arrangement comprises at least one stator segment and at least one rotor segment, and wherein the at least one stator segment and the at least one rotor segment are able to be at least temporarily supported against each other. According to the invention the direct drive generator is a segmented generator with stator segments and rotor segments building at least a part of the generator. These segments are in principle single manageable parts. However in practice the handling of the stator segments and of the rotor segments can be difficult in particular when e.g. a stator element of a stator segment comprises a winding form with a winding and a rotor element of a rotor segment comprises a permanent magnet with a large magnetic pull. Therefore an arrangement comprising at least one stator segment and at least one rotor segment is suggested wherein the stator segment and the rotor segment are able to be at least temporarily supported against each other e.g. during the transport of the arrangement. Thereby the stator element for the power generation and the rotor element for the power generation are arranged oppositely to each other wherein an air gap remains between the stator element for the power generation and the rotor element for the power generation. Since in this way the magnetic circuits concerning the stator element and the rotor element for the power generation are closed, normally no specific protection of the arrangement against undesired magnetic pull is needed, in particular when the generator comprises permanent magnets. As a consequence the transportation of the arrangement comprising a stator segment and a rotor segment which are supported against each other is simplified in comparison to the transport of single stator or rotor segments. Further on, since during assembly and disassembly of the generator a rotor segment is allowed to rest on a stator segment, any crane lift is as a rule disconnected from magnetic pull. Therefore the transport, assembly and disassembly of a generator are simplified.

Preferably the at least one stator segment comprises at least one first supporting projection and the at least one rotor segment comprises at least one second supporting projection, wherein the first supporting projection of the at least one stator segment and the second supporting projection of the at least one rotor segment are able to be at least temporarily supported against each other. By means of the supporting projections a rotor segment is able to rest on stator segment in particular when the generator particularly the arrangements for the generator comprising a stator segment and a rotor segment supported against each other are transported, assembled or disassembled.

Therefore according to an embodiment of the invention the at least one stator segment and the at least one rotor segment of an arrangement are able to build at least temporarily a stator/rotor segment unit.

In a further embodiment of the invention the at least one rotor segment is at least partially arranged inside the at least one stator segment. In this way a compact arrangement is achieved.

According to a variant of the invention the at least one stator segment is a ring-segment-shaped stator segment and/or the at least one rotor segment is a ring-segment-shaped rotor segment. In the assembled status the ring-segment-shaped stator segments build a stator ring and the ring-segment-shaped rotor segments build a rotor ring substantially arranged inside the stator ring.

In a variant of the invention the at least one ring-segment-shaped stator segment comprises an exterior, ring-segment-shaped stator supporting element, a radially inwardly directed front ring-segment-shaped stator connection element arranged on the front side of the exterior, ring-segment-shaped stator supporting element and a radially inwardly directed rear ring-segment-shaped stator connection element arranged on the rear side of the exterior, ring-segment-shaped stator supporting element for establishing a inwardly open, substantially U-shaped ring-segment-shaped stator segment, wherein at least one stator element is arranged on the inside of the exterior ring-segment-shaped stator supporting element. Thereby the expression substantially U-shaped shall also cover other comparable forms such as V-shaped etc.

In a comparable way the at least one ring-segment-shaped rotor segment comprises an exterior, ring-segment-shaped rotor supporting element, a radially inwardly directed front ring-segment-shaped rotor connection element arranged on the front side of the exterior, ring-segment-shaped rotor supporting element and a radially inwardly directed rear ring-segment-shaped rotor connection element arranged on the rear side of the exterior, ring-segment-shaped rotor supporting element for establishing a inwardly open, substantially U-shaped ring-segment-shaped rotor segment, wherein at least one rotor element is arranged on the outside of the exterior ring-segment-shaped rotor supporting element. Thereby the expression substantially U-shaped shall again also cover other comparable forms such as V-shaped etc.

According to a further variant of the invention each ring-segment-shaped stator connection element of the ring-segment-shaped stator segment comprises at least one first supporting projection and each ring-segment-shaped rotor connection element of the ring-segment-shaped rotor segment comprises at least one second supporting projection.

The further object of the invention is achieved by a direct drive or directly driven generator for a wind turbine comprising at least one arrangement as disclosed afore. Typically the generator comprises several arrangements for establishing the mentioned stator ring and the mentioned rotor ring.

According to an embodiment of the invention the generator comprises a front and a rear ring-shaped supporting element of the stator to which ring-shaped supporting elements of the stator several stator segments of several arrangements are attached in a non-destructively detachable way. Preferably the front and the rear ring-shaped supporting elements of the stator are ring-shaped end plates of the stator. As a rule the ring-shaped end plates of the stator are one piece elements ensuring particularly a sufficient roundness.

In a further embodiment of the invention the generator comprises a front and a rear ring-shaped supporting element of the rotor to which ring-shaped supporting elements of the rotor several rotor segments of several arrangements are attached in a non-destructively detachable way. As in case of the stator the front and the rear ring-shaped supporting elements of the rotor are preferably ring-shaped end plates of the rotor. As a rule the ring-shaped end plates of the rotor are one piece elements ensuring particularly a sufficient roundness.

In a further development of the invention the junctions between the front and the rear ring-shaped supporting elements of the stator and the stator segments and/or the junctions between the front and the rear ring-shaped supporting elements of the rotor and the rotor segments are located substantially at a radius in relation to the center axis of the generator which is equal or smaller than the radius of an air gap between the stator elements and the rotor elements. Thus the ring-shaped supporting elements of the stator and the rotor have dimensions in particular diameters, which are preferably significantly smaller than the air gap diameter of the generator. In this way the transport of the ring-shaped supporting elements of the stator and the rotor, the assembly and the disassembly of the stator and the rotor and the generator respectively on the site of erection are simplified.

In case of a wind turbine not the whole mounted generator has to be carried into the nacelle using e.g. a crane. In fact the significantly lighter single manageable parts, arrangements and/or segments of the generator are able to be carried into the nacelle where the generator is able to be assembled, repaired or disassembled.

According to a variant of the invention the width of the air gap between the stator elements and the rotor elements is adjustable. Preferably the junctions between the ring-shaped supporting elements of the stator and the stator segments and/or the junctions between the ring-shaped supporting elements of the rotor and the rotor segments comprise adjusting means for the adjustment of the width of the air gap. According to an embodiment of the invention the adjusting means comprise at least one shim.

According to a further embodiment of the invention a stator segment comprises at least one winding form with a winding as a stator element and/or a rotor segment comprises at least one permanent magnet as a rotor element.

In an embodiment of the invention the stator segments and the ring-shaped supporting elements of the stator and/or the rotor segments and the ring-shaped supporting elements of the rotor comprise axial and/or radial extending flanges for the mounting. Thereby the axial extending flanges extend preferably substantially in the directions of the center axis A of the main shaft and the radial extending flanges extend preferably substantially perpendicularly in relation to the center axis A of the main shaft. In this way the stator and rotor segments can be comparatively simply attached to the respective ring-shaped supporting elements.

According to a further embodiment of the invention at least one of the ring-shaped supporting elements of the rotor and/or at least one of the ring-shaped supporting elements of the stator comprise at least one man hole for providing access to the internals of the generator. Thus at least one of the front or rear ring-shaped supporting elements can have one or more man holes which are preferably closable.

The third object of the invention is achieved by a wind turbine comprising at least one arrangement as disclosed afore and/or a generator as disclosed afore.

The object concerning the method is achieved by a method for the assembly of a generator using afore disclosed arrangements, wherein respectively at least one rotor segment and respectively at least one stator segment are supported against each other for building a combined stator/rotor segment unit, several stator/rotor segment units are transported to the site of erection of the wind turbine, each stator/rotor segment unit is arranged on the ring-shaped supporting elements of the stator and on the ring-shaped supporting elements of the rotor, wherein each stator segment of each stator/rotor segment unit is arranged on the ring-shaped supporting elements of the stator and each rotor segment of each stator/rotor segment unit is arranged on the ring-shaped supporting elements of the rotor. As disclosed afore by building a stator/rotor segment unit wherein preferably a rotor segment rests on a stator segment the magnetic circuits are closed so that the transport is simplified.

According to a variant of the invention first each stator segment of a stator/rotor segment unit is attached to the ring-shaped supporting elements of the stator and then each rotor segment of a stator/rotor segment unit is attached to the ring-shaped supporting elements of the rotor for pulling away each rotor segment from its supporting position.

In a further development of the invention the radial position of a stator segment is adjusted by means of adjusting means arranged between the ring-shaped supporting elements of the stator and the respective stator segment and/or the radial position of a rotor segment is adjusted by means of adjusting means arranged between the ring-shaped supporting elements of the rotor and the respective rotor segment. Thus the desired or required width of the air gap between the stator and rotor elements for the power generation can be adjusted in a relatively simple way.

BRIEF DESCRIPTION OF THE DRAWINGS

The invention will in the following be explained in more detail with reference to the schematic drawings, wherein.

DETAILED DESCRIPTION OF THE INVENTION

Figure 1:
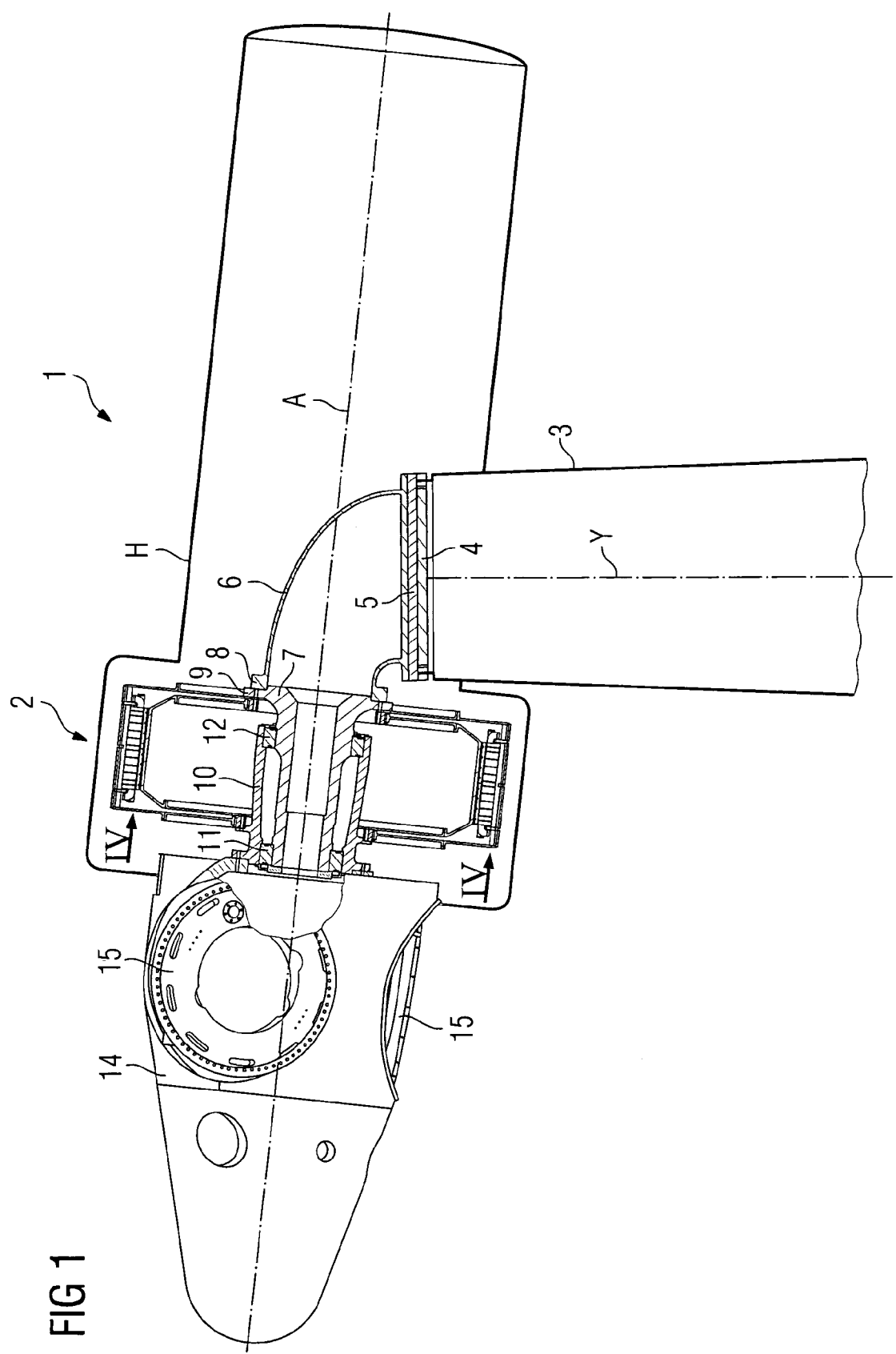
FIG. 1 shows a part of an inventive wind turbine.

FIG. 1 shows schematically a first embodiment of an inventive wind turbine 1 comprising an inventive direct drive or directly driven generator 2 which is arranged on the upwind side of a tower 3 of the wind turbine 1.

A tower flange 4 is arranged on the top of the tower 3. A retaining arrangement is arranged on the tower flange 4 comprising in case of the present embodiment of the invention a bedplate 5, a retaining frame in form of a retaining arm 6 and a stationary or fixed hollow shaft 7. The bedplate 5 is attached to the tower flange 4. The wind turbine 1 comprises in a not explicitly shown manner a yaw system for turning the bedplate 5 of the wind turbine 1 around the centre axis Y of the tower 3 together with the other components of the wind turbine 1 which are directly or indirectly attached to the bedplate 5.

The retaining arm 6 is on its base side directly arranged on the bedplate 5. On the other side the retaining arm 6 comprises a flange 8. The stationary shaft 7 is attached to the flange 8 with a flange 9. The ring-shaped flange 8 of the retaining arm 6 and the ring-shaped flange 9 of the stationary shaft 7 are bolted together with a plurality of bolts arranged around the ring shaped flanges.

A main shaft 10 or a main rotor pipe 10 is pivoted on the stationary shaft 7 by means of a first main bearing 11 and a second main bearing 12. Each main bearing 11, 12 supported by the stationary shaft 7 comprises an inner and an outer bearing shell. The inner bearing shells of the both main bearings 11, 12 are mounted on the stationary shaft 7, whilst the outer bearing shells of the both main bearings 11, 12 are fitted inside the main shaft 10.

On the front end the main shaft 10 comprises a ring-shaped flange 13. The ring-shaped flange 13 is firmly, but detachably connected to a hub 14 of the wind turbine 1. The hub 14 comprises three mounting devices 15 for three not explicitly shown, but well known wind rotor blades.

In case of the present embodiment of the invention the mentioned direct drive or directly driven generator 2 is substantially arranged around the main shaft 10. The direct drive generator 2 comprises a rotor 16 or a rotor arrangement 16 and a stator 17 or a stator arrangement 17.

The rotor 16 comprises in case of the present embodiment of the invention a first supporting element 18 in form of a front ring-shaped rotor end plate 18, a second supporting element 19 in form of a rear ring-shaped rotor end plate 19 and a plurality of ring-segment-shaped rotor segments 20 attached to the front ring-shaped rotor end plate 18 and the rear ring-shaped rotor end plate 19. In case of the present embodiment of the invention the rotor 16 comprises six ring-segment-shaped rotor segments 20 building a rotor ring when the six ring-segment-shaped rotor segments 20 are attached to the preferably one-piece front and rear ring-shaped rotor end plates 18, 19.

Figure 4:
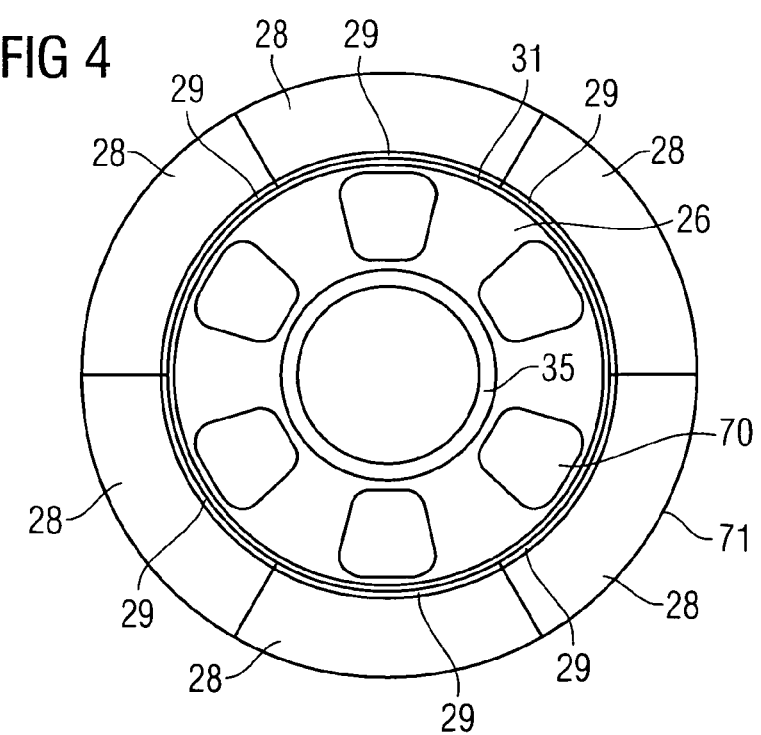
FIG. 4 shows the view of the generator of the wind turbine of FIG. 1 in the direction of the arrows IV of FIG. 1.

The stator 17 comprises in case of the present embodiment of the invention a first supporting element 26 in form of a front ring-shaped stator end plate 26, a second supporting element 27 in form of a rear ring-shaped stator end plate 27 and a plurality of ring-segment-shaped stator segments 28 attached to the front ring-shaped stator end plate 26 and the rear ring-shaped stator end plate 27. In case of the present embodiment of the invention the stator 17 comprises also six ring-segment-shaped stator segments 28 (cp. FIG. 4) building a stator ring when the six ring-segment-shaped stator segments 28 are attached to the preferably one-piece front and rear ring-shaped stator end plates 26, 27.

In case of the present embodiment of the invention the ring-segment-shaped stator segments 28 and the ring-segment-shaped rotor segments 20 are designed in such a way that the junctions 50, 51 between the ring-shaped stator end plates 26, 27 and the ring-segment-shaped stator segments 28 as well as the junctions 52, 53 between the ring-shaped rotor end plates 18, 19 and the ring-segment-shaped rotor segments 20 are located substantially at a radius R1 in relation to a centre axis A of the generator 2 which is smaller than the radius R2 of the air gap 34 between stator elements 33 for the power generation arranged on the ring-segment-shaped stator segments 28 and rotor elements 25 for the power generation arranged on the ring-segment-shaped rotor segments 20. Thus in case of the present embodiment of the invention the maximum diameters of the ring-shaped stator and rotor end plates are 2*R1. These diameters are significantly smaller than the diameter of the air gap 34 (2*R2). This simplifies the transport of the ring-shaped stator and rotor end plates.

A ring-segment-shaped rotor segment 20 comprises an exterior, ring-segment-shaped rotor supporting element 54, a radially inwardly directed front ring-segment-shaped rotor connection element 55 arranged on the front side of the exterior, ring-segment-shaped rotor supporting element 54 and a radially inwardly directed rear ring-segment-shaped rotor connection element 56 arranged on the rear side of the exterior, ring-segment-shaped rotor supporting element 54 for establishing an inwardly open, substantially U-shaped ring-segment-shaped rotor segment 20, wherein at least one rotor element 25 in form of at least one permanent magnet 25 is arranged on the outside of the exterior ring-segment-shaped rotor supporting element 54. Thereby a ring-segment-shaped rotor segment 20 connects the front and the rear ring-shaped rotor end plates 18, 19 with each other.

Figure 2:
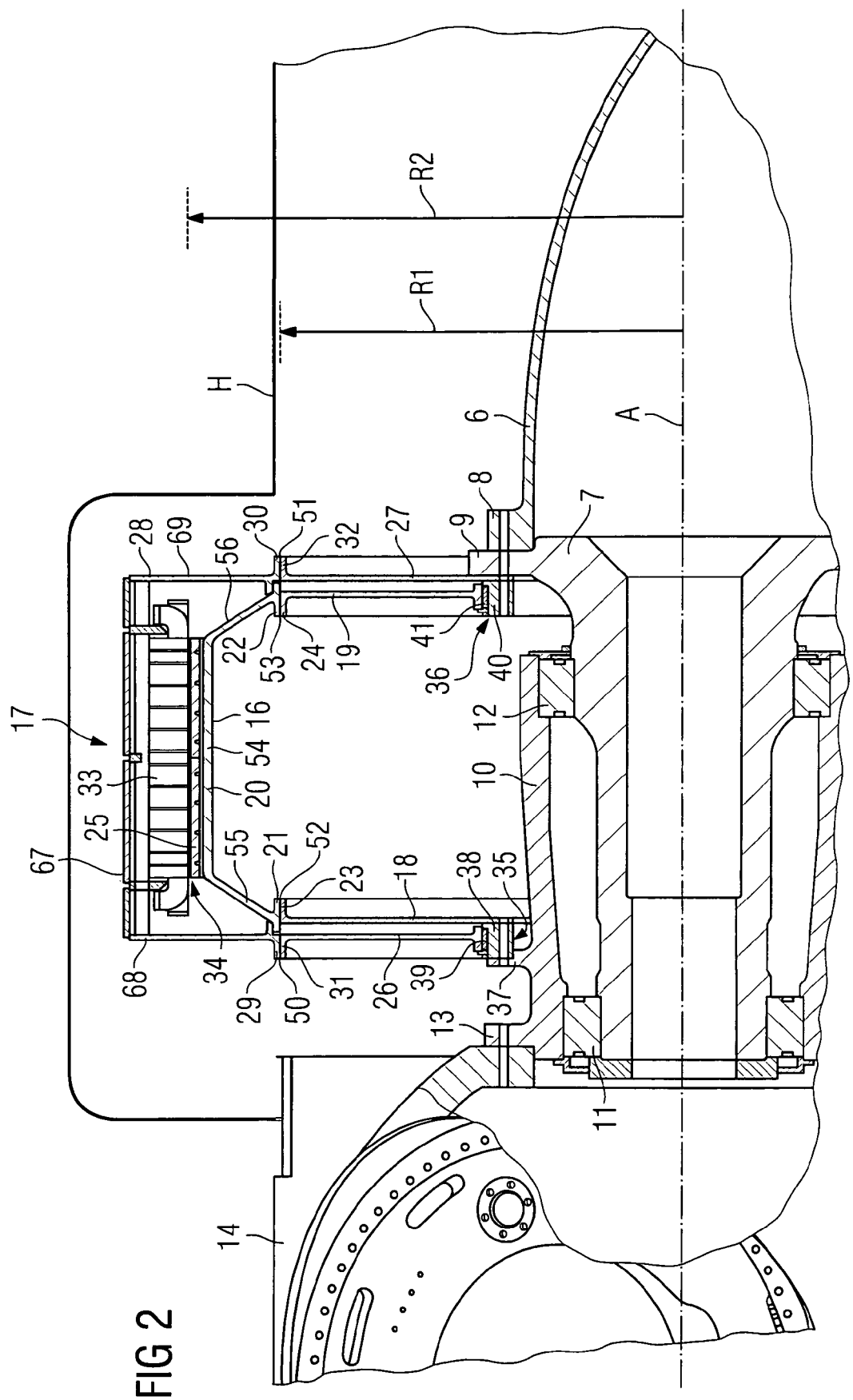
FIG. 2 shows in an enlarged illustration the main shaft and a part of the direct drive generator of the wind turbine of FIG. 1.
Figure 3:
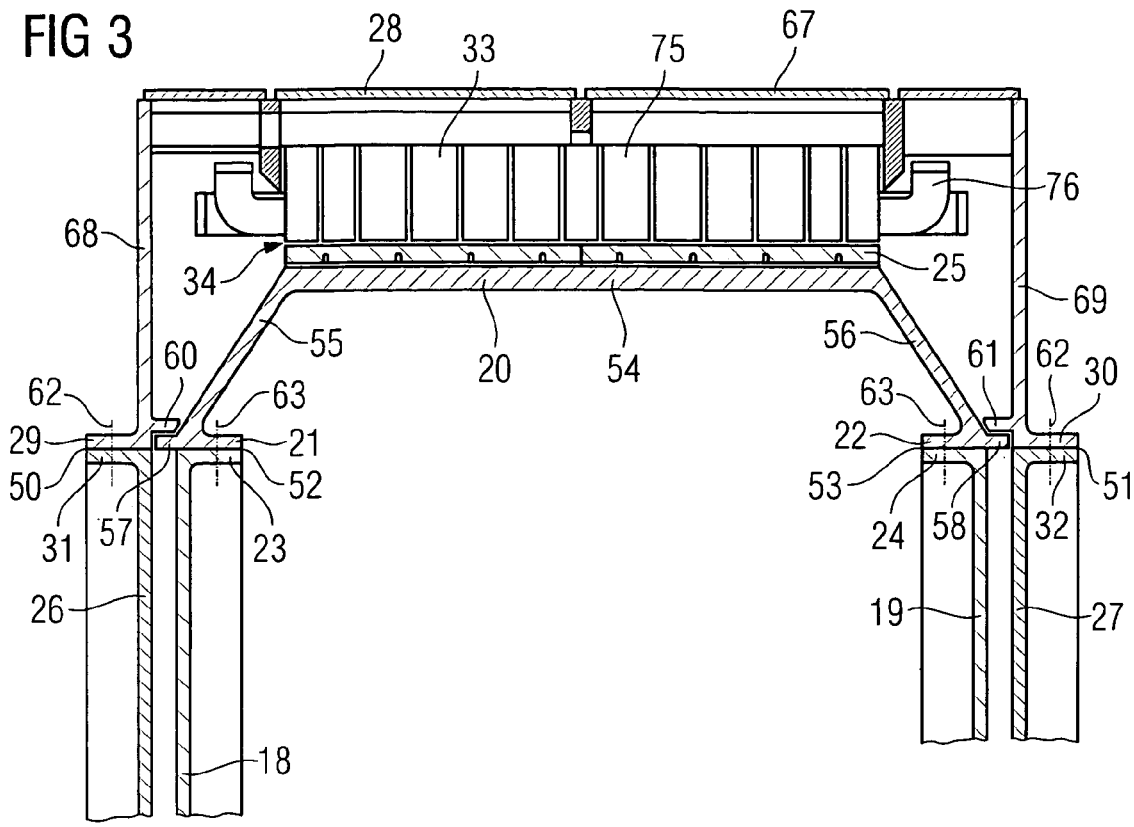
FIG. 3 shows in an enlarged illustration a part of the direct drive generator of the wind turbine of FIG. 1.

As shown in FIG. 2 and FIG. 3 a front ring-segment-shaped rotor connection element 55 comprises on its end a ring-segment-shaped flange 21 and a ring-segment-shaped supporting projection 57. A rear ring-segment-shaped rotor connection element 56 comprises on its end a ring-segment-shaped flange 22 and a ring-segment-shaped supporting projection 58. The front ring-shaped rotor end plate 18 has a ring-shaped flange 23 and the rear ring-shaped rotor end plate 19 has a ring-shaped flange 24. In case of the present embodiment of the invention the flanges 21 and 23 as well as the flanges 22 and 24 are bolted together to build up the rotor 16. In the described way all ring-segment-shaped rotor segments 20 are attached to the front and the rear ring-shaped end plates 18, 19. Thus the rotor 16 has substantially a hollow-cylindrical shape.

In a comparable way a ring-segment-shaped stator segment 28 comprises an exterior, ring-segment-shaped stator supporting element 67, a radially inwardly directed front ring-segment-shaped stator connection element 68 arranged on the front side of the exterior, ring-segment-shaped stator supporting element 67 and a radially inwardly directed rear ring-segment-shaped stator connection element 69 arranged on the rear side of the exterior, ring-segment-shaped stator supporting element 67 for establishing an inwardly open, substantially U-shaped, ring-segment-shaped stator segment, wherein at least one stator element 33 in form of a winding form 75 with a winding 76 is arranged on the inside of the exterior ring-segment-shaped stator supporting element 67. Thereby a ring-segment-shaped stator segment 28 connects the front and the rear ring-shaped stator end plates 26, 27 with each other.

As shown in FIG. 2 and FIG. 3 a front ring-segment-shaped stator connection element 68 comprises on its end a ring-segment-shaped flange 29 and a ring-segment-shaped supporting projection 60. A rear ring-segment-shaped stator connection element 69 comprises on its end a ring-segment-shaped flange 30 and a ring-segment-shaped supporting projection 61. The front ring-shaped stator end plate 26 has a ring-shaped flange 31 and the rear ring-shaped stator end plate 27 has a ring-shaped flange 32. In case of the present embodiment of the invention the flanges 29 and 31 as well as the flanges 30 and 32 are bolted together to build up the stator 17. In the described way all ring-segment-shaped stator segments 28 are attached to the front and the rear ring-shaped stator end plates 26, 27. Thus also the stator 17 has substantially a hollow-cylindrical shape.

In case of the present embodiment of the invention each ring-segment-shaped rotor segment 20 is substantially arranged inside a ring-segment-shaped stator segment 28. In particular during the transport, the assembly and the disassembly of the ring-segment-shaped stator and rotor segments 20, 28 one ring-segment-shaped stator segment 28 and one ring-segment-shaped rotor segment 20 are able to build an arrangement, more precisely a stator/rotor segment unit. Thereby the ring-segment-shaped rotor segment 20 is moved into the ring-segment-shaped stator segment 28 until the ring-segment-shaped rotor segment 20 rests on the ring-segment-shaped stator segment 28. More precisely the projections 57, 58, 60, 61 engage, whereat the supporting projection 60 and the supporting projection 57 as well as the supporting projection 61 and the supporting projection 58 are supported against each other. In general the projections 57, 58, 60, 61 engage if the air gap between the stator elements and the rotor elements for the power generation is reduced to a value a certain level below the nominal value of the air gap. The magnetic pull during the mounting of the stator/rotor segment unit is counteracted by suitable tools, e.g. a set of jacks. Once the projections 57, 58, 60, 61 engage, the magnetic pull is taken by the projections and the suitable tools can be removed. In this position the magnetic circuits are as a rule closed and the stator/rotor segment unit no longer poses any risk in relation to the strong permanent magnets. The stator/rotor segment unit is able to be transported, assembled and disassembled with no special precautions.

On the site of erection of the wind turbine 1 first the supporting structures are assembled—the stationary shaft 7, the main bearings 11, 12, the main shaft 10, a third and a fourth bearing 35, 36, described later, and the ring-shaped rotor end plates 18, 19 as well as the ring-shaped stator end plates 26, 27.

For the assembly of the generator 2 a stator/rotor segment unit is, as indicated above, arranged on the front and the rear ring-shaped end plates 18, 19, 26, 27. Thereby the flange 29 of a front ring-segment-shaped stator connection element 68 and the flange 31 of the front ring-shaped stator end plate 26 as well as the flange 30 of a rear ring-segment-shaped stator connection element 69 and the flange 32 of the rear ring-shaped stator end plate 27 are bolted together with schematically shown flange bolts 62. This is done for all six stator/rotor segment units. Any necessary adjustment of the radial position of a ring-segment-shaped stator segment 28 is carried out with not explicitly shown shims in the junctions 50, 51 between the flanges 29, 31 as well as between the flanges 30, 32. Thereby the respective shims are inserted between the respective flanges and then the flange bolts 62 are inserted in respective bolt holes and tightened.

Afterwards the flanges 21 of the front ring-segment-shaped rotor connection elements 55 and the flange 23 of the front ring-shaped rotor end plate 18 and the flanges 22 of the rear ring-segment-shaped rotor connection elements 56 and the flange 24 of the rear ring-shaped rotor end plate 19 are bolted together with schematically shown flange bolts 63. Thereby the ring-segment-shaped rotor segments 20 are as a rule pulled away from the resting position, in which the projections 57, 58, 50, 61 engage. Any necessary adjustment of the radial position of a ring-segment-shaped rotor segment 20 is carried out with not explicitly shown shims in the junctions 52, 53 between the flanges 21, 23 as well as between the flanges 22, 24 before the flange bolts 63 are inserted in respective bolt holes and finally tightened.

If a ring-segment-shaped rotor segment 20 or a ring-segment-shaped stator segment 28 needs e.g. replacement the described steps are carried out in reverse order and the replacement stator/rotor segment unit is assembled as described.

Based on trial rotations the radial positions of the ring-segment-shaped rotor segments 20 as well as the radial positions of the ring-segment-shaped stator segments 28 are able to be fine tuned with the shims in the junctions 50-53. Thus the width of the air gap 34 between the electrical stator elements 33 of the stator 17 and the permanent magnets 25 of the rotor 16 is able to be adjusted to establish a preferably completely uniform and concentric air gap 34.

In order that the rotor 16 can turn together with the main shaft 10 around the centre axis A of the main shaft 10 and relatively to the stator 17 the wind turbine 1 in particular the direct drive generator 2 comprise the already mentioned third or front generator bearing 35 and the already mentioned fourth or rear generator bearing 36. The relative positions of the stator 17 and the rotor 16 are maintained by the third and the fourth bearing 35, 36.

The third bearing 35 is in case of the present embodiment of the invention attached to a flange 37 of the main shaft 10. More precisely the inner bearing shell 38 of the third bearing 35 is firmly attached to the flange 37 of the main shaft 10. The inner bearing shell 38 of the third bearing 35 is furthermore firmly attached to the front ring-shaped rotor end plate 18, which supports the front part of the rotor 16. The outer bearing shell 39 of the third bearing 35 is firmly connected to the front ring-shaped stator end plate 26, which supports the front part of the stator 17.

The rear part of the stator 17 is supported by the rear ring-shaped stator end plate 27, which is firmly connected to the flange 9 of the stationary shaft 7 and thus to the retaining arrangement. In case of the present embodiment of the invention the inner bearing shell 40 of the fourth bearing 36 is firmly attached to the rear ring-shaped stator end plate 27 and the rear ring-shaped rotor end plate 19 supporting the rear part of the rotor 16 is firmly connected to the outer bearing shell 41 of the fourth bearing 36.

Based on the described arrangement comprising the main shaft 10, the first main bearing 11, the second main bearing 12, the rotor 16, the stator 17, the third bearing 35 and the fourth bearing 36 the main shaft 10 turns in operation of the wind turbine 1 together with the rotor 16 relatively to the stator 17.

For avoiding situations in which the four bearing arrangement is statically undetermined in case of the present embodiment of the invention the front ring-shaped rotor end plate 18 firmly supported on the main shaft 10 and the rear ring-shaped stator end plate 27 firmly supported on the retaining arrangement comprise a certain and sufficient extent of flexibility in the directions of the centre axis A of the main shaft 10. Thereby these end plates 18, 27 act like membranes supporting the rotor 16 and the stator 17 substantially firmly in the radial direction so as to maintain the width of the air gap 34, but flexing readily so as to allow e.g. a bending of the main shaft 10 with no major resistance. In particular the end plates 18, 27 have such dimensions that they have a comparatively little bending stiffness. They simply flex passively when e.g. the main shaft 10 is shifted a bit by deflection. Thus when a bending of the main shaft 10 occurs to which the rotor 16 and the stator 17 are connected the front ring-shaped rotor end plate 18 and the rear ring-shaped stator end plate 27 bend in substantially a respective way in the directions of the centre axis A wherein the width of the air gap 34 is maintained substantially constant or within required tolerances.

As a consequence of the four bearing arrangement, in addition to the loads from the wind turbine rotor and the main shaft 10 the two main bearings 11, 12 carry approximately half of the weight of the generator 2, approximately the other half of the weight of the generator 2 is directly supported on the retaining arrangement. The third or front generator bearing 35 carries approximately half of the weight of the stator 17, approximately the other half of the weight of the stator 17 is supported on the retaining arrangement. The fourth or rear generator bearing 36 carries approximately half of the weight of the rotor 16, approximately the other half of the weight of the rotor 16 is supported on the main shaft 10.

Based on the described design or structure of the wind turbine 1 in particular based on the described generator arrangement comprising the third and fourth bearing the rotor 16 and the stator 17 are supported on both sides, the front side and the rear side. This enables a more lightweight rotor and in particular a more lightweight stator construction with less dimensions of the stator structure in particular of the stator support structure like the end plates and so on to maintain in operation of the wind turbine 1 the width of the air gap 34 within the necessary tolerances along the directions of the centre axis A and around the perimeter.

Unlike to the afore described embodiment of the invention the front ring-shaped stator end plate 26 and the rear ring-shaped rotor end plate 19 are able to comprise the certain extent of flexibility in the directions of the centre axis A of the main shaft 10, whilst the front ring-shaped rotor end plate 18 and the rear ring-shaped stator end plate 27 have not these flexibility. Also in this case the width of the air gap 34 is able to be held substantially constantly or at least within required tolerances.

The ring-shaped rotor end plate and the ring-shaped stator end plate-which have the certain flexibility need not to have the flexibility in the whole end plates. Thus the ring-shaped end plates are able to have different areas. The respective ring-shaped rotor end plate may have e.g. a comparatively rigid area e.g. for the attachment of the third bearing and an area having the mentioned flexibility in the directions of the centre axis A. In the same way the respective ring-shaped stator end plate may have e.g. a comparatively rigid area e.g. for the attachment of the fourth bearing and an area having the mentioned flexibility in the directions of the centre axis A.

The front ring-shaped rotor end plate is able to be directly arranged on the main shaft. In this case the third bearing is able to be directly attached to the main shaft or to the front ring-shaped rotor end plate.

It is not necessary to attach the fourth bearing to the rear ring-shaped stator end plate. The fourth bearing is also able to be directly attached to the retaining arrangement e.g. the stationary shaft or the retaining frame or arm.

As a rule the ring-shaped end plates are made of an appropriate metal or metal alloy. The ring-shaped end plates do not need to have the same diameter. In fact the different ring-shaped end plates are able to have different diameters. In this case also the respective ring-segment-shaped segments have to be modified in relation to the radial extension of the radially inwardly directed ring-segment-shaped stator connection elements to build the stator or the rotor.

FIG. 4 shows the view of the generator 2 of the wind turbine 1 in the direction of the arrows IV of FIG. 1. In FIG. 4 the third or generator bearing 35, the front ring-shaped stator end plate 26, the flanges 29, 31 and the six ring-segment-shaped stator segments 28 building the stator ring 71 are cognizable. In case of the present embodiment of the invention the front ring-shaped stator end plate 26 comprises six man holes 70 providing access to the internals of the generator. In the same way the other ring-shaped end plates of the stator or the rotor are able to comprise man holes. Thereby the man holes are as a rule closed by means of a kind of door.

In case of the present embodiment of the invention in each ring-segment-shaped stator segment 28 a ring-segment-shaped rotor segment 20 is substantially centrically arranged. But it is also possible that two or more ring-segment-shaped rotor segments 20 are substantially arranged in a ring-segment-shaped stator segment 28.

By the way the generator 2 is able to comprise less or more ring-segment-shaped stator segment 28 building the stator ring as well as less or more ring-segment-shaped rotor segment 20 building the rotor ring as described afore. Furthermore it is not necessary that the rotor segments or the stator segments have a ring-segment shape.

The non-destructively detachable connection between the end plates and the ring-segment-shaped segments need not to be a bolted joint.

In case of the described embodiment of the invention the ring-segment-shaped stator segments 28 and the ring-shaped stator end plates 26, 27 as well as the ring-segment-shaped rotor segments 20 and the ring-shaped rotor end plates 18, 19 comprise axial extending flanges 21-24, 29-32 for the mounting. Thereby the axial extending flanges 21-24, 29-32 extend substantially in the directions of the centre axis A. But the mounting is also able to be done by radial extending flanges or other suitable means. Thereby the radial extending flanges extend substantially perpendicularly in relation to the centre axis A.

Unlike described before the direct drive generator is also able to be arranged on the downwind side of the tower.

By the way the wind turbines 1 comprise a housing H normally called the nacelle which contain the generator 2 and at least a part of the retaining arrangement.

The invention claimed is:

1. An arrangement for a wind turbine, comprising:
   a tower of the wind turbine;
   a tower flange at a top of the tower;
   a direct drive generator arranged on an upwind side of the tower, said direct drive generator comprising:
      a stator,
      a stator segment in the stator,
      a stator element in the stator segment for generating a power,
      a rotor rotatable around a center axis of the generator,
      a rotor segment in the rotor and supported against the stator segment, and
      a rotor element in the rotor segment for generating the power;
   wherein the stator segment comprises a first supporting projection;
   wherein the rotor segment comprises a second supporting projection;
   wherein the first supporting projection and the second supporting projection are supported against each other.

2. The arrangement as claimed in claim 1, wherein the stator segment and the rotor segment build a stator/rotor segment unit.

3. The arrangement as claimed in claim 1, wherein the rotor segment is arranged inside of the stator segment.

4. The arrangement as claimed in claim 1,
   wherein the stator segment is ring-segment shaped such that a plurality of stator segments are provided such that the stator is ring shaped; said generator further comprising a ring-shaped stator end plate with a plurality of man holes to provide access to an internal portion of the generator; and wherein a respective ring-segment shaped rotor segment is centrically arranged within each of the plurality of stator segments.

5. The arrangement as claimed in claim 1, further comprising a retaining arm with a first side attached to the top of the tower and a second side attached to the generator; said second side configured to be bolted adjacent to a stationary shaft.

6. The arrangement as claimed in claim 1, further comprising:
   a front and a rear ring-shaped supporting elements of the stator for attaching the stator segment, and
   a front and a rear ring-shaped supporting element of the rotor for attaching the rotor segment.

7. The arrangement as claimed in claim 6, wherein a junction between the front and the rear ring-shaped supporting elements of the stator and the stator segment or a junction between the front and the rear ring-shaped supporting elements of the rotor and the rotor segment is located substantially at a radius in relation to a center axis of the generator which is equal or smaller than a radius of an air gap between the stator element and the rotor element.

8. The arrangement as claimed in claim 7, wherein a width of the air gap is adjustable.

9. The arrangement as claimed in claim 8, wherein the junction between the ring-shaped supporting elements of the stator and the stator segment or the junction between the ring-shaped supporting elements of the rotor and the rotor segment comprises an adjusting device for adjusting the width of the air gap.

10. The arrangement as claimed in claim 9, wherein the adjusting device comprises a shim.

11. The arrangement as claimed in claim 6, wherein the front and the rear ring-shaped supporting elements of the stator or the front and the rear ring-shaped supporting elements of the rotor comprise a man hole to provide access to an internal portion of the generator.

12. The arrangement as claimed in claim 1,
   wherein the stator segment comprises a winding form with a winding which is used as the stator element, or
   wherein the rotor segment comprises a permanent magnet which is used as the rotor element.

13. The arrangement as claimed in claim 1, wherein six stator segments form the ring-shaped stator and wherein six rotor segments form a ring-shaped rotor.

* * * * *